United States Patent [19]

Chang

[11] Patent Number: 5,091,811
[45] Date of Patent: Feb. 25, 1992

[54] READ HEAD MOUNTING STRUCTURE FOR MAGNETIC CARD READER

[75] Inventor: Yeng Ming Chang, Taipei, Taiwan

[73] Assignee: Uniform Industrial Corp., Taipei, Taiwan

[21] Appl. No.: 570,510

[22] Filed: Aug. 21, 1990

[51] Int. Cl.$^5$ .................. G11B 5/56; G11B 21/24
[52] U.S. Cl. .................. 360/104; 360/2; 360/109
[58] Field of Search .............. 360/104, 109, 2, 17; 235/449, 484

[56] References Cited

U.S. PATENT DOCUMENTS

| | | | |
|---|---|---|---|
| 3,940,796 | 2/1976 | Haun et al. | 235/482 X |
| 4,167,664 | 9/1979 | Pass | 360/109 X |
| 4,297,735 | 10/1981 | Eppich | 360/104 |
| 4,304,992 | 12/1981 | Kobayashi et al. | 235/482 X |
| 4,628,386 | 12/1986 | Chabrolle | 360/2 X |
| 4,672,492 | 6/1987 | Muramatsu | 360/109 |
| 4,775,785 | 10/1988 | Nakahara et al. | 235/449 |
| 4,809,108 | 2/1989 | Tanaka et al. | 360/104 X |

Primary Examiner—John H. Wolff
Attorney, Agent, or Firm—Fleit, Jacobson, Cohn, Price, Holman & Stern

[57] ABSTRACT

A read head mounting structure for a magnetic card reader, comprising a read head secured to a read head mounting frame by a plane spring which is secured to the read head mounting frame by two pin rods at two opposite ends. Two rows of bolt holes are made on a base at two opposite sides so that the read head mounting frame can be adjustably attached to the base at different level position permitting the read head to partly protrude through a window into a magnetic card feed slot for reading the assigned magnetic track of the magnetic cards.

1 Claim, 3 Drawing Sheets

READ HEAD MOUNTING STRUCTURE FOR MAGNETIC CARD READER

BACKGROUND OF THE INVENTION

I. Field of the Invention

The present invention relates to read head mounting structures, and more particularly to a read head mounting structure for a magnetic card reader in which the level position of the magnetic card read head can be adjusted according to the location of the assigned track of the magnetic cards to read.

Magnetic card reader is a device for reading data from magnetic cards. A magnetic card generally has three different magnetic tracks for recording different data. Users may assign either one of the three tracks for recording. The read head of a magnetic card reader must be fastened at a position corresponding to the location of the assigned track of the magnetic cards to read. In regular magnetic card readers, the position of a read head is permanently fixed and can not be changed for reading different magnetic track. Therefore, a magnetic card reader can only be used for reading one type of magnetic cards, and different magnetic card reader shall be required for reading the magnetic cards of different assigned track.

II. Brief Description of Prior Art

FIG. 1 illustrates a type of read head mounting structure for a magnetic card reader according to the prior art, in which the base (A) comprises two raised portions (C) having each a bolt hole (B) thereon respectively for mounting a fastening member (D) by screw means permitting the pin (E) of each fastening member (D) to secure a plate spring (F) to the base (A) so as to firmly retain a read head (H) in the window (G) with its front reading end projecting in the magnetic card feed slot (I) for reading magnetic cards. In this structure, the read head (H) is fixedly secured to the plate spring (F) through welding connection, and the plate spring (F) is secured to the base (A) by the pins (E) of the fastening members (D) which pins (E) are respectively inserted through the two mounting holes (J) at the two opposite ends of the plate spring (F). One disadvantage of this structure is its complicated read head mounting process. Another disadvantage of this structure is that the position of the read head is not adjustable since it is fixedly secured to the plate spring through welding process.

SUMMARY OF THE INVENTION

The present invention has been accomplished under the circumstances in view. It is one object of the present invention to provide a read head mounting structure for a magnetic card reader, which is easy to assemble and can firmly secure the read head in reading position.

It is another object of the present invention to provide a read head mounting structure for a magnetic card reader, which can be conveniently adjusted to change the position of the read head according to the location of the assigned track on the magnetic cards to read.

To achieve the above objects and according to the present invention, a read head mounting structure for a magnetic card reader comprises a read head mounting frame having an opening at the middle for mounting a read head. The read head is secured to the read head mounting frame by a plate spring which has two opposite ends respectively secured by two pin rods at two opposite ends of the read head mounting frame. Two retaining strips respectively extend from the opening of the read head mounting frame at two opposite ends to firmly retain the read head in position. The read head mounting frame is attached to a base by screws which are respectively inserted in either one of the two rows of bolt holes which are made by both sides of a read head read window at the center of the base. The base has a magnetic card feed slot transversely made thereon at the middle and disposed in communication with the read head read window. By securing the read head mounting frame to either two bolt holes of the same level on the base, the read head is retained to partly protrude through the window into the magnetic card feed slot to read the assigned track of the magnetic cards.

DETAILED DESCRIPTION OF THE PREFERRED EMBODIMENT

Figure 1:
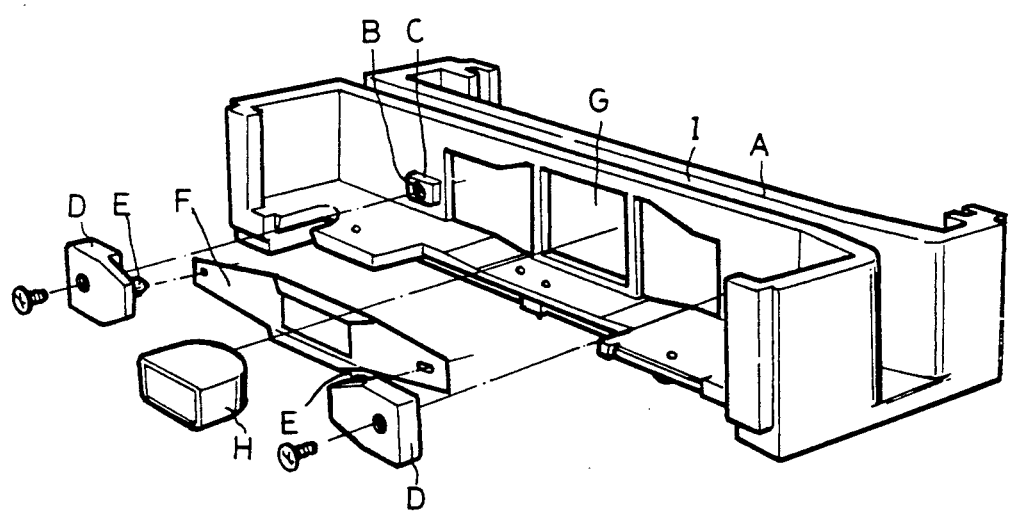
FIG. 1 is a perspective dismantled view of a read head mounting structure for a magnetic card reader according to the prior art.

Referring to FIG. 1, a read head mounting structure for a magnetic card reader according to the present invention is generally comprised of a base 1, a read head mounting frame 2, a read head 3 and a plate spring 4. The base 1 comprises a magnetic card feed slot 11 transversely disposed at the middle, a read head read window 12 at the center, and two rows of bolt holes 13 at two opposite sides. The read head mounting frame 2 comprises a flat strip portion having an opening 21 at the middle, two raised, opposite ends having each an unitary support 22, which has a pin rod 23 extending downward therefrom, and a mounting hole 24 through which a screw 5 is fastened in either of the bolt holes 13 to secure the read head mounting frame 2 to the base 1.

Figure 2:
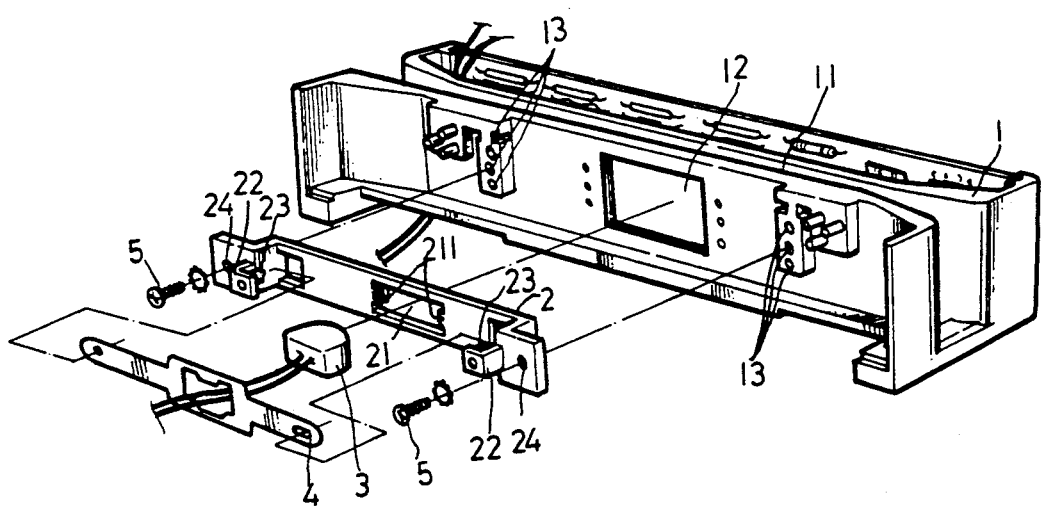
FIG. 2 is a perspective dismantled view of the preferred embodiment of the present invention.
Figure 3:
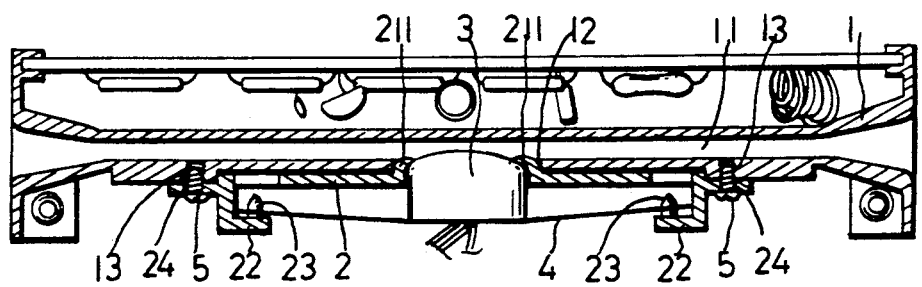
FIG. 3 is a sectional assembly view of the preferred embodiment of the present invention.

Referring to FIG. 2, as soon as the read head mounting frame 2 is fixedly attached to the base 1, the opening 21 of the read head mounting frame 2 is aimed at the read head read window 12 and the magnetic card feed slot 11. Two unitary retaining strips 211 are made on the opening 21 at two opposite ends at the side near the magnetic card feed slot 11 for holding the read head 3, once it is inserted in the opening 21, permitting the read head 3 to partly protrude in the magnetic card feed slot 11. The plate spring 4 is mounted on the read head mounting frame 2 to stably secure the read head 3 in the opening 21, with its two opposite ends respectively secured to the read head mounting frame 2 by the two pin rods 23 of the two supports 22 (see FIG. 3). Therefore, the procedure to mount the read head 3 in the opening 21 of the read head mounting frame 2 is quite simple and convenient.

After the read head 3 is secured in the opening 21 of the read head mounting frame 2 by the plate spring 4, screws 5 are respectively inserted through the mounting holes 24 in corresponding bolt holes 13 on the base 1 to fixedly secure the read head mounting frame 2 to the base 1, permitting the read head 3 to be guided by the opening 21 of the magnetic mounting frame 2 to insert through the read head read window 12 and partly project in the magnetic card feed slot 11 of the base 1 for reading magnetic cards.

Figure 4:
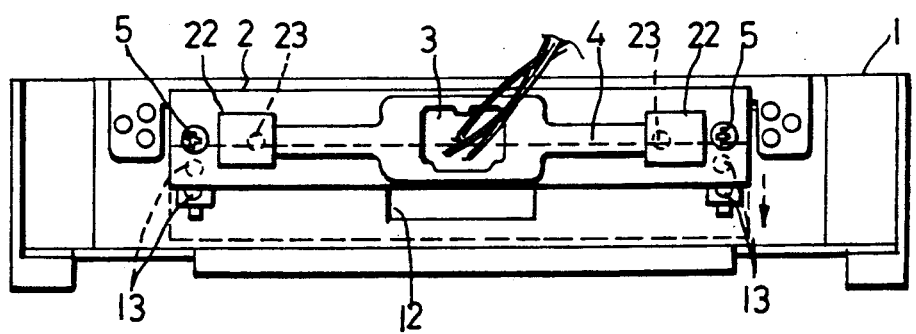
FIG. 4 is a schematic drawing illustrating an operation to adjust the read head mounting frame on the base.

Referring to FIG. 4, the position of the read head 3 in the read head read window 12 can be adjusted upward or downward to fit the assigned magnetic track of the magnetic cards to read. The process to adjust the position of the read head 3 is quite simple and outlined hereinafter. Remove the screws 5 from the mounting holes 24 and move the read head mounting frame 2 upward or downward to a desired position. Then, fasten the screws through the mounting holes 24 in the upper or lower bolt holes 13 to secure the read head mounting frame 2 to an upper or lower position (see FIG. 4) to fit the assigned track of the magnetic cards to read.

As described above, the present invention is to provide such a read head mounting structure for a magnetic card reader, which is easy to assemble and maintain and can be conveniently adjusted according to the location of the assigned track of the magnetic cards to read.

I claim:

1. A read head mounting structure for a magnetic card reader, comprising:

a base having a magnetic card feed slot transversely disposed at the middle, a read head read window at the center in communication with said magnetic card feed slot, and two rows of bolt holes at two opposite sides;

a read head mounting frame comprising a flat strip portion at the middle and two raised edge portions at two opposite ends, said flat strip portion having an opening at the middle, said two raised edge portions having each an unitary support and a mounting hole respectively made thereon, said support having a pin rod extending downward therefrom;

a read head for reading magnetic cards;

a plate spring having two opposite ends respectively secured to said read head mounting frame by the two pin rods of the two supports of said read head mounting frame to firmly retain said read head in said opening on said read head mounting frame; and characterized in that said read head mounting frame is attached to said base by two fastening means, which are respectively inserted through the mounting holes on the two opposite ends of said read head mounting frame and respectively fastened in either one of the two rows of bolt holes on said base, permitting said read head to partly protrude through said read head read window in said magnetic card feed slot.

* * * * *